United States Patent [19]

Brokenshire et al.

[11] Patent Number: 5,020,878
[45] Date of Patent: Jun. 4, 1991

[54] METHOD AND APPARATUS FOR GENERATING A BINOCULAR VIEWING MODEL AUTOMATICALLY ADAPTED TO A SELECTED IMAGE

[75] Inventors: Daniel A. Brokenshire, Portland; Ronald W. Bryant, Mount Angel; Javad Farjami, Beaverton; Gary L. Brown, Lake Oswego, all of Oreg.

[73] Assignee: Tektronix, Inc., Beaverton, Oreg.

[21] Appl. No.: 325,843

[22] Filed: Mar. 20, 1989

[51] Int. Cl.⁵ .............................................. G02B 27/02
[52] U.S. Cl. ................................................... 350/133
[58] Field of Search ................ 350/133, 138, 139, 132

[56]  References Cited
U.S. PATENT DOCUMENTS

| | | | |
|---|---|---|---|
| 3,402,977 | 9/1988 | La Russa et al. | 350/545 |
| 4,153,334 | 5/1979 | Kato et al. | 350/132 |

Primary Examiner—Scott J. Sugarman
Assistant Examiner—Rebecca D. Gass
Attorney, Agent, or Firm—Francis I. Gray; Mark M. Meinenger

[57] ABSTRACT

A stereoscopic graphics display system (10) includes a binocular viewing model generator (96) that automatically adapts a binocular viewing model to a selected stereoscopic image. An extrema accumulation unit (90) identifies extrema data corresponding to a region that bounds the selected image. The extrema data are delivered to the binocular viewing model generator, which designates a zero disparity location within the region and a disparity angle that is compatible with the dimensions of the selected image. The binocular viewing model generated in accordance with the selected image allow it to be rendered with improved three-dimensional qualities.

19 Claims, 5 Drawing Sheets

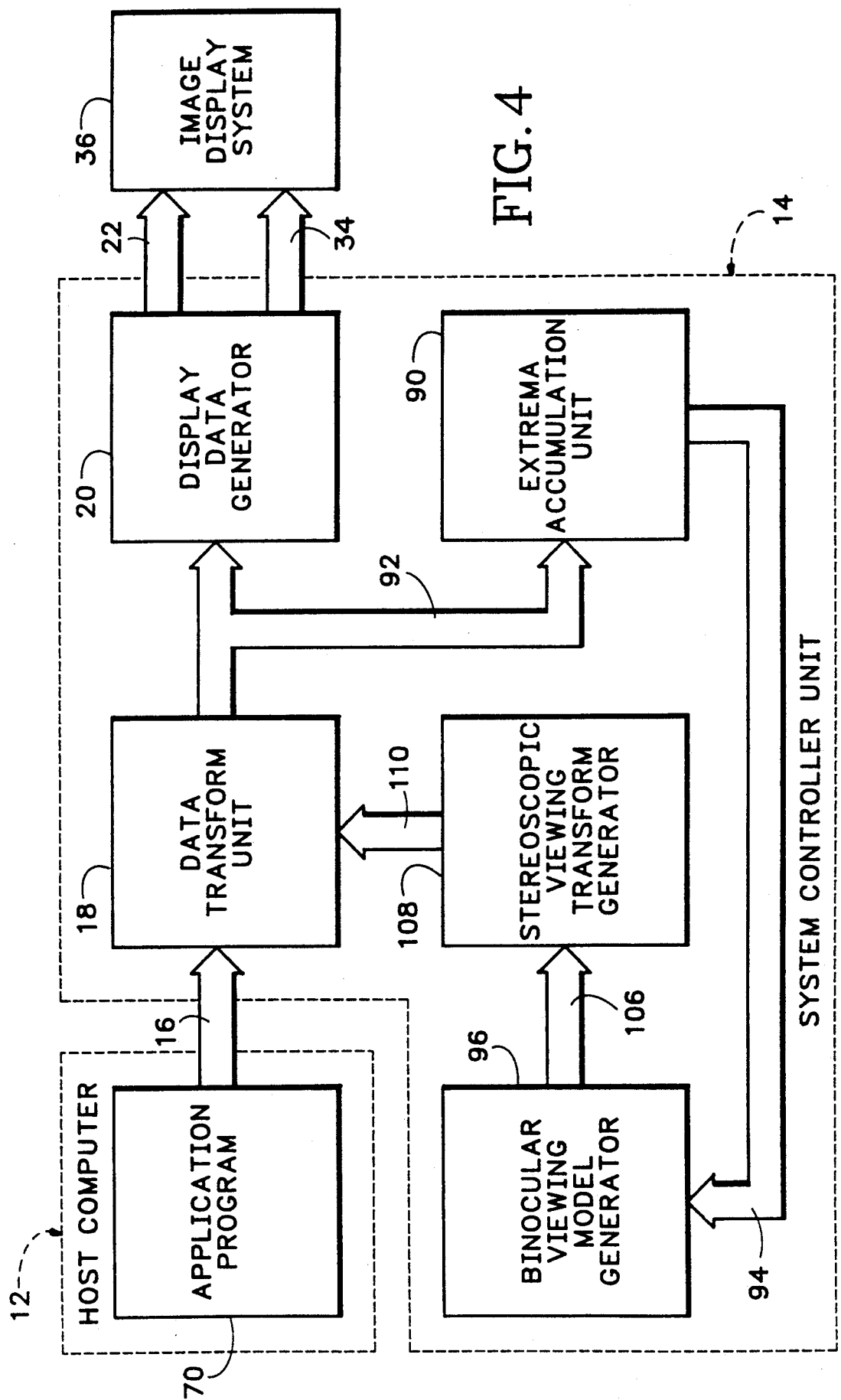

METHOD AND APPARATUS FOR GENERATING A BINOCULAR VIEWING MODEL AUTOMATICALLY ADAPTED TO A SELECTED IMAGE

TECHNICAL FIELD

The present invention relates to graphics display systems and, in particular, to a method of and an apparatus for generating a binocular viewing model in a stereoscopic graphics display system.

BACKGROUND OF THE INVENTION

A stereoscopic graphics display system forms on a display screen stereoscopic images that appear to have three-dimensional qualities. Such display systems can be used advantageously in association with, for example, mechanical engineering computer-aided design systems.

A stereoscopic image of an object includes a right-eye view of the object and a left-eye view of the object. The right- and left-eye views are rendered on a two-dimensional display screen and are directed to an observer's right and left eyes, respectively. The right- and left-eye views typically differ by a preselected amount of binocular disparity that is defined by a binocular viewing model. The binocular disparity allows the observer to perceive from the right- and left-eye views the three-dimensional qualities of the stereoscopic image, which appears to lie within a three-dimensional viewing volume.

A stereoscopic graphics display system typically employs a single, fixed binocular viewing model to generate the right- and left-eye views of all stereoscopic images. The binocular viewing model is defined, for example, by a zero disparity point having a fixed location within the three-dimensional viewing volume and a disparity angle representing a fixed angle by which an image is rotated about the zero disparity point to establish the right- and left-eye views. The location of the zero disparity point is typically independent of the location of a stereoscopic image rendered within the three-dimensional viewing volume, and the magnitude of the disparity angle is typically independent of the size of the stereoscopic image.

An observer perceives the three-dimensional qualities of a stereoscopic image by "fusing" the right- and left-eye views into a single image. The fusing of the right- and left-eye views is an automatic physiological response of which most people are capable. An observer cannot fuse, however, right- and left-eye views having corresponding image components that are separated by a distance greater than a physiology-limited distance. For most observers, the physiology-limited distance is about 0.03 times the distance between the observer and the image (i.e., the viewing distance). With a viewing distance of about 60 cm., for example, a typical observer would be unable to fuse right- and left-eye views that have corresponding image components separated by a distance greater than about 1.8 cm.

In addition, most observers would be unable to fuse right- and left-eye views if the distance between corresponding image components on the display screen is comparable to the size of the image. For example, a stereoscopic graphics display system could render an image having a depth of 30 cm. and ends that each have a height of 2 cm. and a width of 2 cm. A binocular viewing model having a disparity angle of 6° and a disparity point midway along the depth of the image would provide a separation of about 1.6 cm. between corresponding image components (i.e., the ends) of the right- and left-eye views. Since the separation of 1.6 cm. is comparable to the 2 cm. height and the 2 cm. width of the end of the image, a typical observer would be unable to fuse the right- and left-eye views into a single stereoscopic image.

In response to the single, fixed binocular viewing model employed in a conventional stereoscopic graphics display system, many observers manually select a relatively small disparity angle of between 2° and 4°. Such a small disparity angle is substantially less than the conventional default disparity angle of about 6° and reduces the three-dimensional qualities of most stereoscopic images. Observers select the relatively small disparity angle, however, to avoid having to manually adjust the binocular viewing model for each different stereoscopic image. Although it avoids the requirement that the binocular viewing model be adjusted for each stereoscopic image, the use of a relatively small disparity angle reduces the three-dimensional qualities of many stereoscopic images and provides, therefore, suboptimal performance of the stereoscopic graphics display system.

SUMMARY OF THE INVENTION

An object of the present invention is, therefore, to provide a method of generating a binocular viewing model in a stereoscopic graphics display system.

Another object of this invention is to provide such a method in which a binocular viewing model is automatically adapted to a selected stereoscopic image.

A further object of this invention is to provide such a method that is capable of generating a binocular viewing model in accordance with the size of a selected image and its position within a three-dimensional viewing volume.

Still another object of this invention is to provide an apparatus for generating a binocular viewing model in a stereoscopic graphics display system.

The present invention is a method of and an apparatus for generating a binocular viewing model in a stereoscopic graphics display system. In a preferred embodiment, a binocular viewing model is represented by a zero disparity point and a disparity angle. The method and apparatus of this invention establish the zero disparity point and the disparity angle in accordance with the size of a selected stereoscopic image and its position within a three-dimensional viewing volume. This invention provides, therefore, an "auto-adaptive" stereoscopic graphics display system that automatically adapts a binocular viewing model to a selected image.

The method of this invention entails, for example, defining the stereoscopic image within a three-dimensional viewing volume and identifying within the viewing volume a region that bounds the image. The binocular viewing model is adapted to the stereoscopic image by establishing a zero disparity location within the region bounding the image and by establishing a disparity angle that is compatible with the size of the region.

The zero disparity point and the disparity angle provide for the selected image right- and left-eye views that an observer could fuse without experiencing eye strain. As a result, the zero disparity point and the disparity angle generated in accordance with the present invention allow the stereoscopic graphics display system to provide stereoscopic images with improved three-dimensional qualities.

Additional objects and advantages of the present invention will be apparent from the following detailed description of a preferred embodiment thereof, which proceeds with reference to the accompanying drawings.

BRIEF DESCRIPTION OF THE DRAWINGS

FIG. 4 is a schematic block diagram of an apparatus that generates a binocular viewing model and that is incorporated into the stereoscopic graphics display system of FIG. 1.

DETAILED DESCRIPTION OF PREFERRED EMBODIMENT

Figure 1:
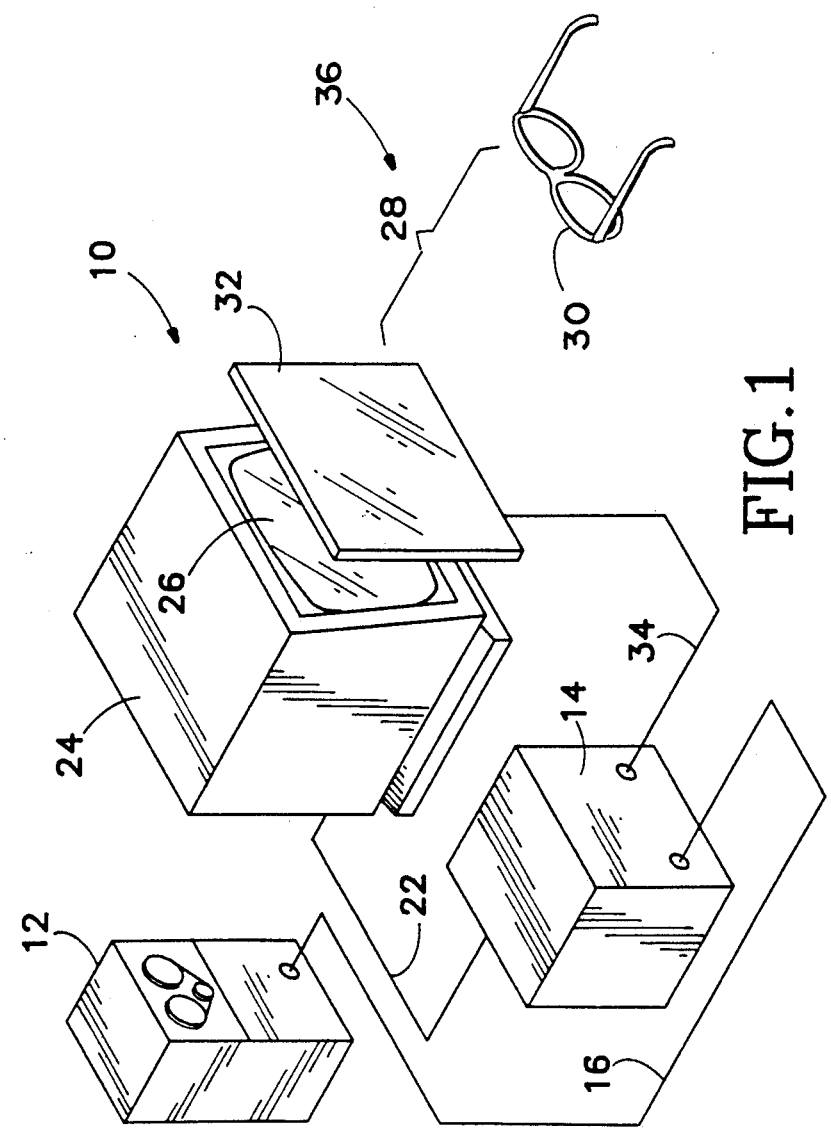
FIG. 1 is a diagram of a stereoscopic graphics display system in direct data communication with a host computer.

FIG. 1 is a diagrammatic representation of a stereoscopic graphics display system 10 in direct data communication with a main or host computer 12. Display system 10 includes a system controller unit 14 that receives image data delivered through a data transfer means or bus 16 from host computer 12. The image data are generated by an application program such as, for example, a mechanical engineering computer-aided design program that resides in host computer 12.

System controller unit 14 includes a data transform unit 18 (FIG. 4) and a display data generator 20 (FIG. 4). Data transform unit 18 and display data generator 20 cooperate to provide on a display data bus 22 control signals that direct a cathode-ray tube 24 to form on its display screen 26 a stereoscopic image in accordance with three-dimensional image data received from host computer 12. Three-dimensional image data correspond to a three-dimensional representation of a physical object. Such data are used for rendering on a two-dimensional display screen an image representing a one-eyed (i.e., monocular), three-dimensional view of the object.

Data transform unit 18 (FIG. 4) of system controller unit 14 transforms the three-dimensional image data into stereoscopic image data. In particular, data transform unit 18 performs a first data transformation in which the object represented by the three-dimensional image data is translated, rotated, and scaled to provide adapted three-dimensional image data representing the object with a user-selected position, orientation, and size, respectively. In a second data transformation, data transform unit 18 transforms the adapted three-dimensional image data into stereoscopic image data representing a stereoscopic image with the user-selected position, orientation, and size. Data transform unit 18 operates, for example, in a manner similar to that of the image data processor described in U.S. Pat. No. 4,896,210 issued to Brokenshire et al on Jan. 23, 1990 entitled "Stereoscopic Graphics Display Terminal with Image Data Processing."

Stereoscopic image data correspond to right- and left-eye views of an object, which views are formed on display screen 26 and are directed by a stereoscopic switch unit 28 toward an observer's right and left eyes, respectively. The right- and left-eye views forming a stereoscopic image of an object allow the observer to perceive the three-dimensional qualities of the object. The stereoscopic image can employ perspective or parallel projection and can include hidden-line removal, shading, or other cues to assist an observer to visualize the three-dimensional properties of the object.

Bos U.S. Pat. No. 4,719,507, issued Jan. 12, 1988, for "Stereoscopic" Imaging System With Passive Viewing Apparatus, describes the construction and operation of one suitable stereoscopic switch unit 28, which includes a set of polarized eyeglasses 30 and a liquid crystal encoder module 32 that receives control signals from an output 34 of system controller unit 14.

Encoder 32 separately encodes alternate light images on display screen 26 of cathode-ray tube 24 in right- and left-circularly polarized light. The alternate light images correspond to the right- and left-eye views of the object. Polarized eye glasses 30 include right and left lenses which transmit, respectively, the right- and left-circularly polarized light, thereby transmitting the right-eye view of the object to the observer's right eye and the left-eye view of the object to the observer's left eye. Cathode-ray tube 24, liquid crystal encoder module 32, and eyeglasses 30 comprise an image display means or system 36.

Figure 2:
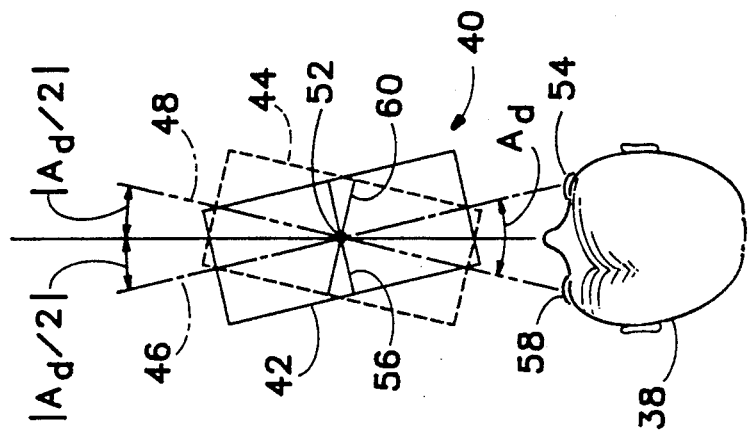
FIG. 2 is a plan view of a schematic representation of an observer viewing a stereoscopic viewing volume.

FIG. 2 is a plan view of an observer 38 viewing a stereoscopic viewing volume 40. Viewing volume 40 comprises three-dimensional right- and left-eye viewing spaces 42 and 44, respectively, in which a stereoscopic representation of an object is depicted. Viewing volume 40 and viewing spaces 42 and 44 each have a third dimension that extends into the plane of the page. Viewing spaces 42 and 44 are aligned with respective lines-of-sight 46 and 48, which are separated by a binocular disparity angle $A_d$. The disparity angle $A_d$ corresponds to a rotational displacement between viewing spaces 42 and 44 about a vertical zero disparity axis 52. Preferably, viewing spaces 42 and 44 are rotated in opposite directions about axis 52 by an angle $|A_d/2|$ to form the disparity angle $A_d$.

The observer's right eye 54 views a two-dimensional right-eye view plane 56 in which a three-dimensional representation of a right-eye view of the object is formed with perspective, hidden-line removal, shading, or other visual cues to depict depth. Similarly, the observer's left eye 58 views a two-dimensional left-eye view plane 60 in which a similar three-dimensional representation of a left-eye view of the object is formed. View planes 56 and 60 typically correspond to the plane of display screen 26 upon which the right- and left-eye views of the object are alternately formed. Differences between the right- and left-eye views of the object correspond to binocular disparity that allows the observer to perceive depth in the stereoscopic image of the object.

With reference again to FIG. 1 and brief reference to FIG. 4, an application program 70 residing in host computer 12 generates three-dimensional image data representing a three-dimensional object. The three-dimensional image data are directed along data transfer bus 16 to system controller unit 14, which transforms the three-dimensional image data into stereoscopic image data and which generates signals for controlling image display system 36. Controller unit 14 generates control signals for cathode-ray tube 24 and encoder module 32, the signals being simultaneously provided to display data bus 22 and output 34, respectively, thereby to alternately display the right- and left-eye views of the object.

Figure 3:
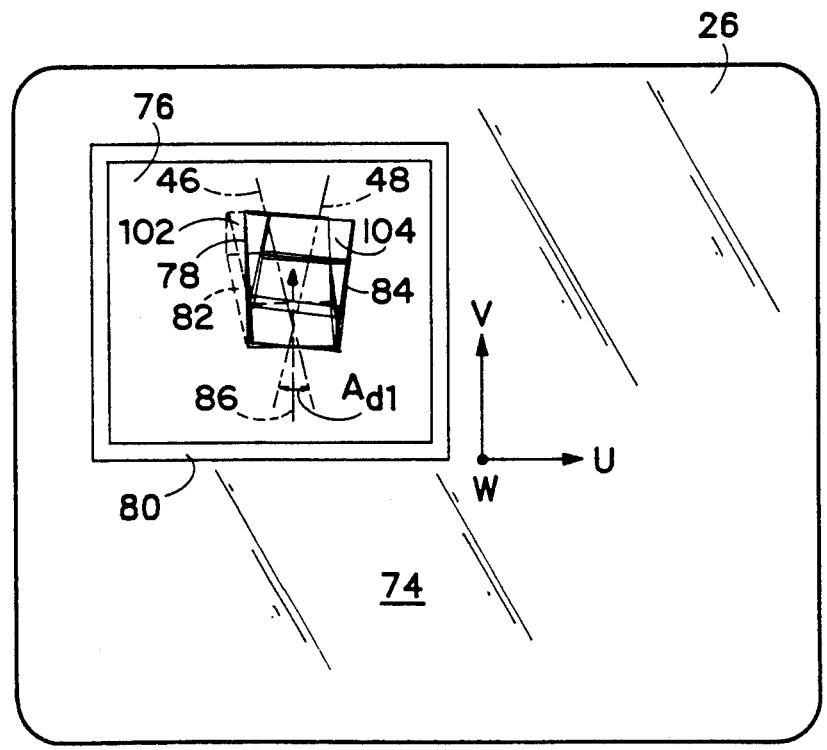
FIG. 3 shows an exemplary display of a stereoscopic image rendered in accordance with this invention.

FIG. 3 shows an exemplary display 74 rendered on display screen 26 of cathode-ray tube 24. Display 74 includes a graphics window 76 within which a graphics display image 78 is rendered. Window 76 is outlined by a window border 80. Display 74 is synthesized into a stereoscopic image by means of stereoscopic switch unit 28 and the physiological response of the observer.

Image 78 is defined with respect to a three-dimensional Cartesian coordinate system having a U-axis that extends in a horizontal direction across display screen 26, a V-axis that extends in a vertical direction across display screen 26, and a W-axis that extends in a direction perpendicular to the plane of display screen 26. The coordinate system shown in FIG. 3 is arranged with a "left-handed" orientation. For purposes of consistency, the description set forth below also refers to a "left-handed" coordinate system. It will be appreciated, however, that the left-handed coordinate system is exemplary and that other coordinate systems are compatible with the present invention.

Image 78 includes a right-eye view 82 and a left-eye view 84 that are generated by rotating the views about a zero disparity axis 86 that is substantially parallel to the V-axis. Right-eye view 82 is drawn with broken lines for purposes of clarity. In operation, both right-eye view 82 and left-eye view 84 would be rendered with solid lines on display screen 26. The views are rotated in opposite directions about axis 86 by an angle of $|A_d/2|$ to form between the views the disparity angle $A_d$. The location of axis 86 and the magnitude of the disparity angle A comprise a binocular viewing model that is particular to image 78.

Image 78 has maximum coordinate values positioned along the U- and W-axes and designated $U_{max}$ and $W_{max}$, respectively, and minimum coordinate values positioned along the U- and W-axes and designated $U_{min}$ and $W_{min}$, respectively. The maximum and minimum coordinate values are identified by an accumulation unit 90 (FIG. 4) and are referred to as extrema data. The extrema data are employed in generating a binocular viewing model compatible with image 78, as described below in greater detail.

With reference to FIGS. 3 and 4, data transform unit 18 receives three-dimensional image data from application program 70 residing in host computer 12. In the first data transformation, data transform unit 18 generates adapted three-dimensional image data representing the image with a user-selected position, orientation, and size. The adapted three-dimensional image data are delivered to extrema accumulation unit 90 via a data transfer bus 92. Accumulation unit 90 identifies the extrema data (i.e., $U_{max}$, $U_{min}$, $W_{max}$, and $W_{min}$) and transfers the extrema data to an input 94 of a binocular viewing model generator 96. The extrema data establish the dimensions of, for example, image 78 along the U- and W-axes. It will be appreciated, however, that the extrema data may alternatively be obtained with reference to either of the right- and left-eye views or with reference to an abbreviated image description that includes the approximate shape and size of the image.

Binocular viewing model generator 96 generates in accordance with the extrema data a binocular viewing model that is compatible with image 78. In particular, binocular viewing model generator 96 identifies a planar region that bounds image 78. The region may be, for example, a rectangle defined by the coordinate values $U_{max}$, $U_{min}$, $W_{max}$, and $W_{min}$. Binocular viewing model generator 96 then establishes a zero disparity axis that is substantially parallel to the V-axis and that passes through the region bounding image 78.

In addition, viewing model generator 96 establishes a disparity angle that limits the separation between corresponding image components in the right- and left-eye views to a distance that is less than a preselected maximum distance. With reference to image 78, for example, viewing model generator 96 establishes the disparity angle $A_d$ such that it provides a separation between ends 102 and 104 (i.e., corresponding image components) of respective views 82 and 84 that is less than the preselected maximum distance. As a result, right-eye view 82 and left eye view 84 are rendered such that a typical observer would be able to fuse the views into a stereoscopic image without experiencing eye strain.

Viewing model generator 96 delivers data representing the zero disparity axis and the disparity angle to an input 106 of a stereoscopic viewing transform generator 108. Transform generator 108 generates from the zero disparity axis and disparity angle a linear algebraic stereoscopic viewing transform by which three-dimensional image data are transformed into stereoscopic image data. The stereoscopic viewing transform generated by transform generator 108 is delivered to an input 110 of data transform unit 18, which transforms the adapted three-dimensional image data into stereoscopic image data. The stereoscopic image data are transferred via data transfer bus 92 to display data generator 20, which generates display control signals corresponding to the stereoscopic image data. The display control signals are delivered to image display system 36 via data bus 22 and output 34, thereby to render on display screen 26 right- and left-eye views of a stereoscopic image.

In an alternative embodiment, accumulation unit 90 identifies the maximum and minimum coordinate values along the U-, V-, and W-axes, and binocular viewing model generator 96 establishes in accordance with this extrema data a zero disparity point that is located within a three-dimensional region that bounds image 78. It will be appreciated, however, that a zero disparity point is equivalent to a zero disparity axis because a rotation about a zero disparity point establishes an axis with zero disparity.

Figure 5:
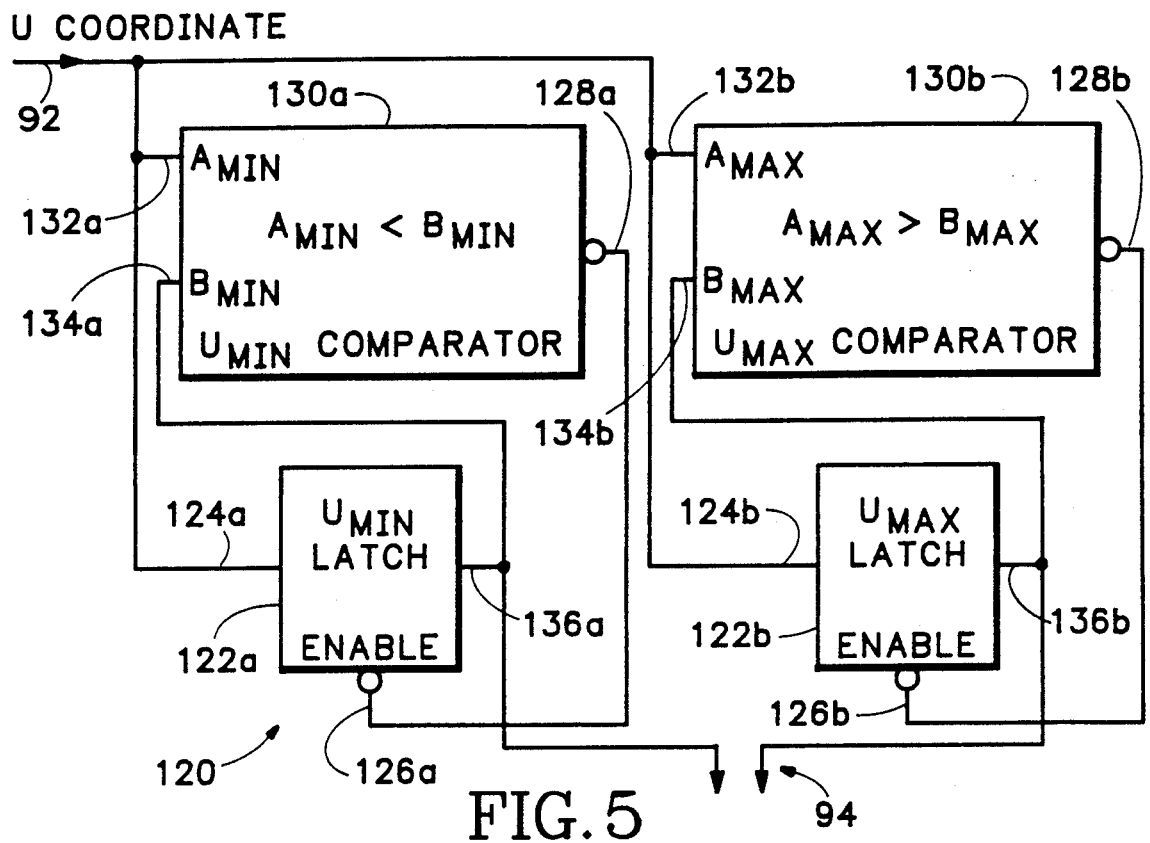
FIG. 5 is a simplified block diagram showing an extrema accumulation unit included in the apparatus of FIG. 3.

FIG. 5 is a schematic block diagram of a first accumulation component 120 of accumulation unit 90, which includes first accumulation component 120 and a second accumulation component (not shown) that identify the extreme values of the U-axis coordinates and W-axis coordinates, respectively. The first and second accumulation components include similar components such that the description of first accumulation component 120 is applicable to the second accumulation component.

Accumulation component 120 includes latch circuits 122a and 122b having respective inputs 124a and 124b. Latches 122a and 122b latch onto the value of the U-axis coordinate of the adapted three-dimensional image data in response to enable signals received at enable inputs 126a and 126b, respectively. The values of the U-axis coordinate received at inputs 124a and 124b are typically represented by a digital signal. The value of the U-axis coordinate signal changes in accordance with the image data representing an image.

An enable signal is delivered to enable input 126a of latch 122a from an output 128a of a comparator 130a. Comparator 130a has an $A_{min}$ input 132a that receives the U-axis coordinate signal (i.e., $U_{coordinate}$) from data bus 92 and a $B_{min}$ input 134a that receives a minimum U-axis coordinate value (i.e., $U_{min}$) from an output 136a of latch 122a. Whenever the $U_{coordinate}$ value delivered to $A_{min}$ input 132a is less than the $U_{min}$ value delivered to $B_{min}$ input 134a, comparator 130a delivers an enable signal to enable input 126a of latch 122a. As a result, latch 122a latches onto the $U_{coordinate}$ value present at input 124a and thereby resets the minimum U-axis coordinate value (i.e., $U_{min}$) to the newly acquired value. The operation of latch 122a and comparator 130a may be represented by the logic expression:

If $U_{min} > U_{coordinate}$, then $U_{min} = U_{coordinate}$.

Similarly, an enable signal is delivered to enable input 126b of latch 122b from an output 128b of a comparator 130b. Comparator 130b includes an $A_{max}$ input 132b that receives the U-axis coordinate signal (i.e., $U_{coordinate}$) from data bus 92 and a $B_{max}$ input 134b that receives a maximum U-axis coordinate value (i.e., $U_{max}$) from an output 136b of latch 122b. Whenever the $U_{coordinate}$ value delivered to $A_{max}$ input 132b is greater than the $U_{max}$ value delivered to $B_{max}$ input 134b, comparator 130b delivers an enable signal to enable input 126b of latch 122b. As a result, latch 122b latches onto the $U_{coordinate}$ value present at input 124b and thereby resets the maximum U-axis coordinate value (i.e., $U_{max}$) to the newly acquired value. The operation of latch 122b and comparator 130b may be represented by the logic expression:

If $U_{max} < U_{coordinate}$, then $U_{max} = U_{coordinate}$.

As a result, the values $U_{min}$ and $U_{max}$ are fixed values that are selectable from the $U_{coordinate}$ values corresponding to an image.

For a parallel projection such as, for example, image 78 (FIG. 3), binocular viewing model generator 96 (FIG. 4) establishes a zero disparity axis that intersects the U-W plane at a U-axis coordinate position $U_{zero}$ and a W-axis coordinate position $W_{zero}$ represented by the equations:

$$U_{zero} = (U_{max} + U_{min})/2$$

$$W_{zero} = W_{min} + K \times (W_{max} - W_{min})/2,$$

in which the multiplicative factor K is a user-specified constant of between zero and one that positions the zero disparity axis at different locations along the W-axis.

Whenever the factor K equals zero, the zero disparity axis is positioned at $W_{min}$ and the entire image 78 (FIG. 3) is perceived by the observer to be behind display screen 26, thereby providing a positive parallax or disparity. Whenever the factor K equals one, the zero disparity axis is positioned at $W_{max}$ and the entire image 78 (FIG. 3) is perceived by the observer to be in front of display screen 26, thereby providing a negative parallax or disparity. Whenever the factor K equals 0.5, the zero disparity axis is positioned midway between $W_{min}$ and $W_{max}$ and half of image 78 is perceived by the observer to be in front of display screen 26 and half of image 78 is perceived by the observer to be behind display screen 26.

A factor K equal to 0.5 typically provides an optimal location for the zero disparity axis. In particular, such a value maximizes the depth of the image perceived by an observer because the positive and negative disparities in the image are equal. Moreover, the eye strain experienced by most observers is reduced by such a zero disparity axis because they focus their eyes on the center of a stereoscopic image, which would have zero binocular disparity when the factor K equals 0.5.

The zero disparity axis identified by the coordinates $U_{zero}$ and $W_{zero}$ extends through a region that bounds a selected image. It will be appreciated, however, that the zero disparity axis will not intersect the boundary or interior of all selected images. For example, a zero disparity axis positioned at the center of a region bounded by a horizontally-aligned torus would not intersect the boundary or "interior" of the torus. It is contemplated that such examples are compatible with the present invention.

Binocular viewing model generator 96 establishes a disparity angle $A'_d$ that is the lesser of a maximum user-specified disparity angle $A_d$ and a disparity angle that reflects the aspect ratio of the image. The disparity angle $A'_d$ generated by viewing model generator 96 is represented by the equations:

$$A'_d = 2 \times \arctan[MIN(1, \Delta U/\Delta W) \times \tan(A_d/2)]$$

$$\Delta U = U_{max} - U_{min}$$

$$\Delta W = W_{max} - W_{min}$$

in which the ratio $\Delta U/\Delta W$ represents the aspect ratio of the image and the factor $MIN(1, \Delta U/\Delta W)$ represents a "minimum function" whose value is the lesser of 1 and the term $\Delta U/\Delta W$.

In operation, however, viewing model generator 96 generates the disparity angle $A'_d$ in accordance with the approximation:

$$A'_d \approx MIN(1, \Delta U/\Delta W) \times A_d.$$

This approximation introduces an error of about three percent for angles as large as 40°. It will be appreciated, however, that disparity angles are typically less than about 10° and that the error introduced by the approximation is less than 0.2 percent for such angles.

Viewing model generator 96 generates a disparity angle $A'_d$ that is equal to either the user-specified maximum disparity angle $A_d$ or the disparity angle $A_d$ reduced by the aspect ratio $\Delta U/\Delta W$. With respect to a stereoscopic graphics display system employing a fixed disparity angle, for example, an image in which $\Delta W = 2\Delta U$ would provide twice the separation between image components located at $W_{max}$ in the right- and left-eye views as would an image in which $\Delta W = \Delta U$. The factor $MIN(1, \Delta U/\Delta W)$ allows viewing model generator 96 to generate, therefore, a disparity angle $A'_d$ that limits the separation between corresponding image components in the right- and left-eye views. As a result, the disparity angle $A'_d$ is compatible with the aspect ratio of the image so that an observer can fuse the rightand left-eye views into a stereoscopic image without experiencing eye strain.

In an alternative embodiment, the factor $MIN(1,\Delta U/\Delta W)$ may be replaced with an alternative factor $MIN(\Delta U,\Delta W)/MAX(\Delta U,\Delta W)$, in which $MAX(\Delta U,\Delta W)$ is a "maximum function" that assumes the value of the greater one of the terms $\Delta U$ and $\Delta W$. The alternative factor provides a disparity angle compatible with images that are comparatively wide (i.e., images having a relatively large $\Delta U$) as well as images that are comparatively deep (i.e., images having a relatively large $\Delta W$). The factor $MIN(1,\Delta U/\Delta W)$, on the other hand, is directed primarily to images that are comparatively deep.

In connection with an image formed in accordance with a perspective projection, binocular viewing model generator 96 (FIG. 4) establishes a zero disparity point at a U-axis coordinate position $U_{zero}$, a V-axis coordinate position $V_{zero}$, and a W-axis coordinate position $W_{zero}$ that are represented by the equations:

$$U_{zero}=(U_{max}+U_{min})/2$$

$$V_{zero}=(V_{max}+V_{min})/2$$

$$W_{zero}=W_{min}+K'(W_{max}-W_{min})/2.$$

The multiplicative perspective factor $K'$ positions the zero disparity point at different locations along the W-axis in a manner similar to that described with reference to the parallel multiplicative factor $K$ employed with parallel projection. The perspective factor $K'$ is described below with reference to FIGS. 6A, 6B, and 6C.

The V-axis coordinate position $V_{zero}$ is included to reduce vertical disparity that can be introduced into a stereoscopic perspective projection. Vertical disparity may be created in a binocular viewing model that employs a zero disparity point and a disparity angle. In such a system, the U- and W-axis positions of an image component in a monocular view are changed when the monocular view is rotated to provide right- and left-eye views. A transformation of a view into a perspective projection includes, however, a V-axis foreshortening of the view as a function of the U- and W-axis coordinates. As a result, differences in the U- and W-axis positions of corresponding image components in right- and left-eye views can have different V-axis positions (i.e., vertical disparity) in a perspective projection.

Figure 6A:
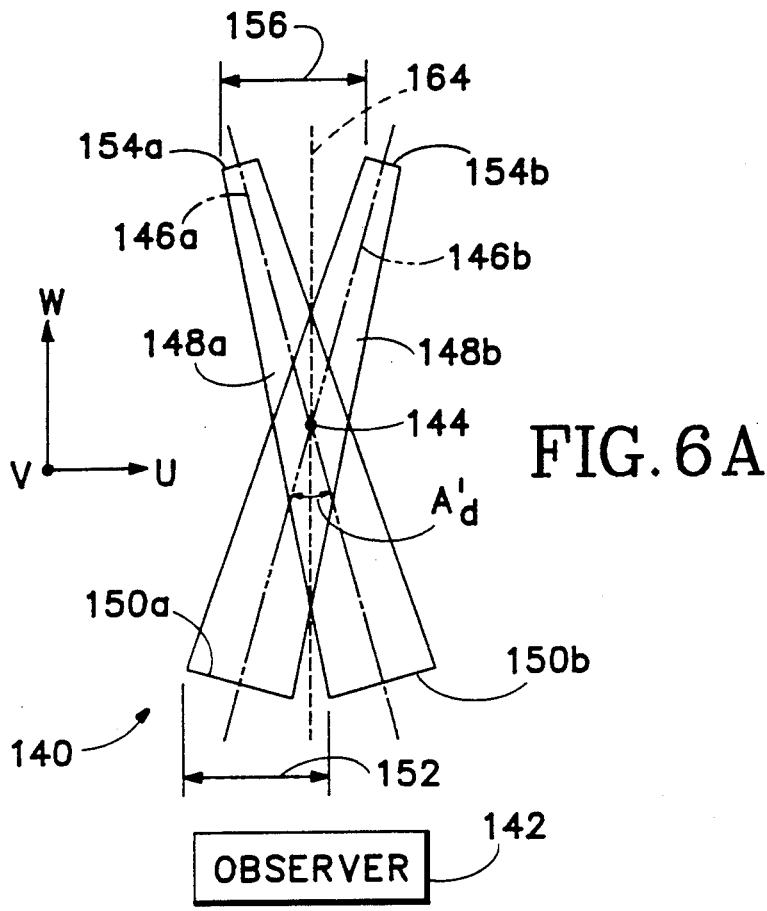
FIGS. 6A, 6B, and 6C are schematic representations of a stereoscopic image, a view volume, and stereoscopic lines-of-sight, respectively, relating to a stereoscopic image rendered in accordance with a perspective projection.

FIG. 6A is a plan view of an exemplary stereoscopic image 140 rendered by stereoscopic graphics display system 10 in accordance with a perspective projection. Image 140 represents a rectangular block and, therefore, decreases in size as the image extends away from observer 142 along the W-axis. A zero disparity point 144 is positioned at the intersection of lines-of-sight 146a and 146b that extend along the respective views 148a and 148b of image 140.

Whenever zero disparity point 144 is positioned midway through views 148a and 148b along lines-of-sight 146a and 146b, front-most image components 150a and 150b in the respective views 148a and 148b are separated by a distance 152, and rearmost image components 154a and 154b in the respective views 148a and 148b are separated by a distance 156. Distances 154 and 156 are different because of the "foreshortening" of an image along the W-axis in a perspective view. The different distances 154 and 156 represent different amounts of positive and negative disparity, which cause image 140 to have suboptimal three-dimensional characteristics. The perspective factor $K'$ represents, therefore, a compensation of the parallel factor $K$ to accommodate the differences between the positive and negative disparity in a stereoscopic image employing perspective projection.

Figure 6B:
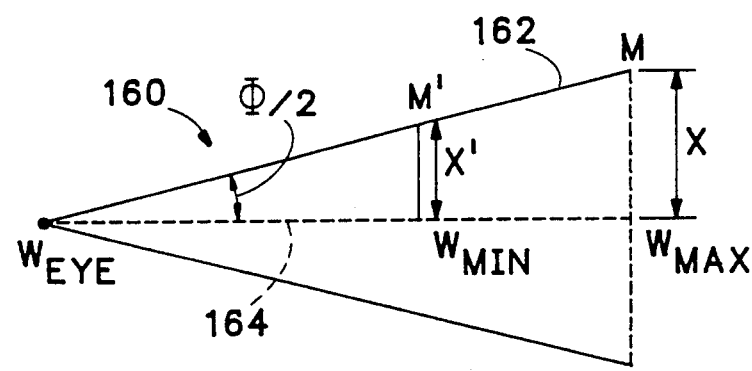

FIG. 6B is a cross section of a perspective canonical view volume 160 in which points $M'$ and $M$ are positioned at the respective locations $W_{min}$ and $W_{max}$ along a perspective projection 162. Projection 162 is offset from a central longitudinal axis 164 by an angle $\Phi/2$, in which $\Phi$ represents the perspective angle and axis 164 bisects the disparity angle $A'_d$ (FIG. 6A) The points $M'$ and $M$ are projected toward an observer's eye (not shown) positioned at a location $W_{eye}$ along axis 164 and are separated from axis 164 by distances $X'$ and $X$, respectively. Perspective view volume 160 may be characterized by the equations:

$$\tan(\Phi/2)=X'/|W_{min}-W_{eye}|=X/|W_{max}-W_{eye}|.$$

Figure 6C:
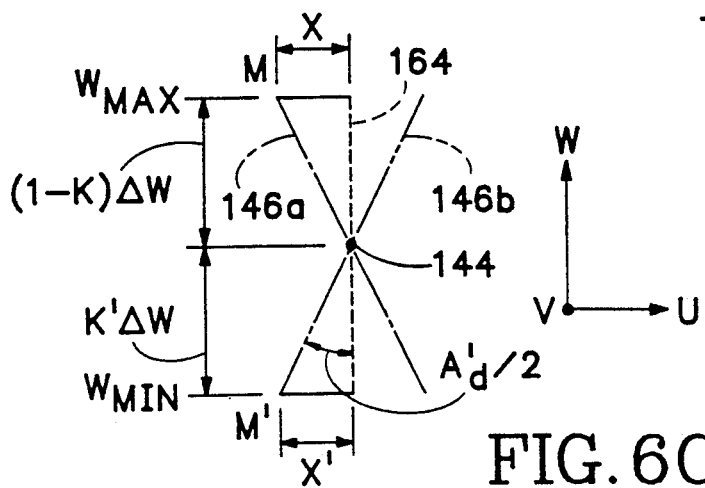

FIG. 6C is a diagrammatic representation of lines-of-sight 146a and 146b in which zero disparity point 144 is positioned along longitudinal axis 164 in accordance with the perspective multiplicative factor $K'$. With points $M'$ and $M$ offset from axis 164 by the distances $X'$ and $X$, respectively, the disparity angle $A'_d$ may be represented by the equations:

$$\tan(A'_d/2)=X'/[2\times K'\times \Delta W)]=X/[2\times(1-K') \times \Delta W].$$

In accordance with the equations characterizing FIGS. 6B and 6C and a scaling factor $(1-K)/K$ in which $K$ represents the parallel multiplicative factor, the perspective multiplicative factor $K'$ may be represented as:

$$K'=(W_{min}-W_{eye})/[(W_{max}-W_{eye})\times(1-K)/K+(W_{min}-W_{eye})].$$

Such an equation for the perspective factor $K'$ is directed to a "left-handed" coordinate system in which:

$$W_{eye} \leq W_{min} \leq W_{max}.$$

The perspective factor $K'$ conditions the user-specified factor $K$ to provide in a perspective projection the relative amounts of positive and negative disparity that the factor $K$ would provide in a parallel projection.

Figure 7:
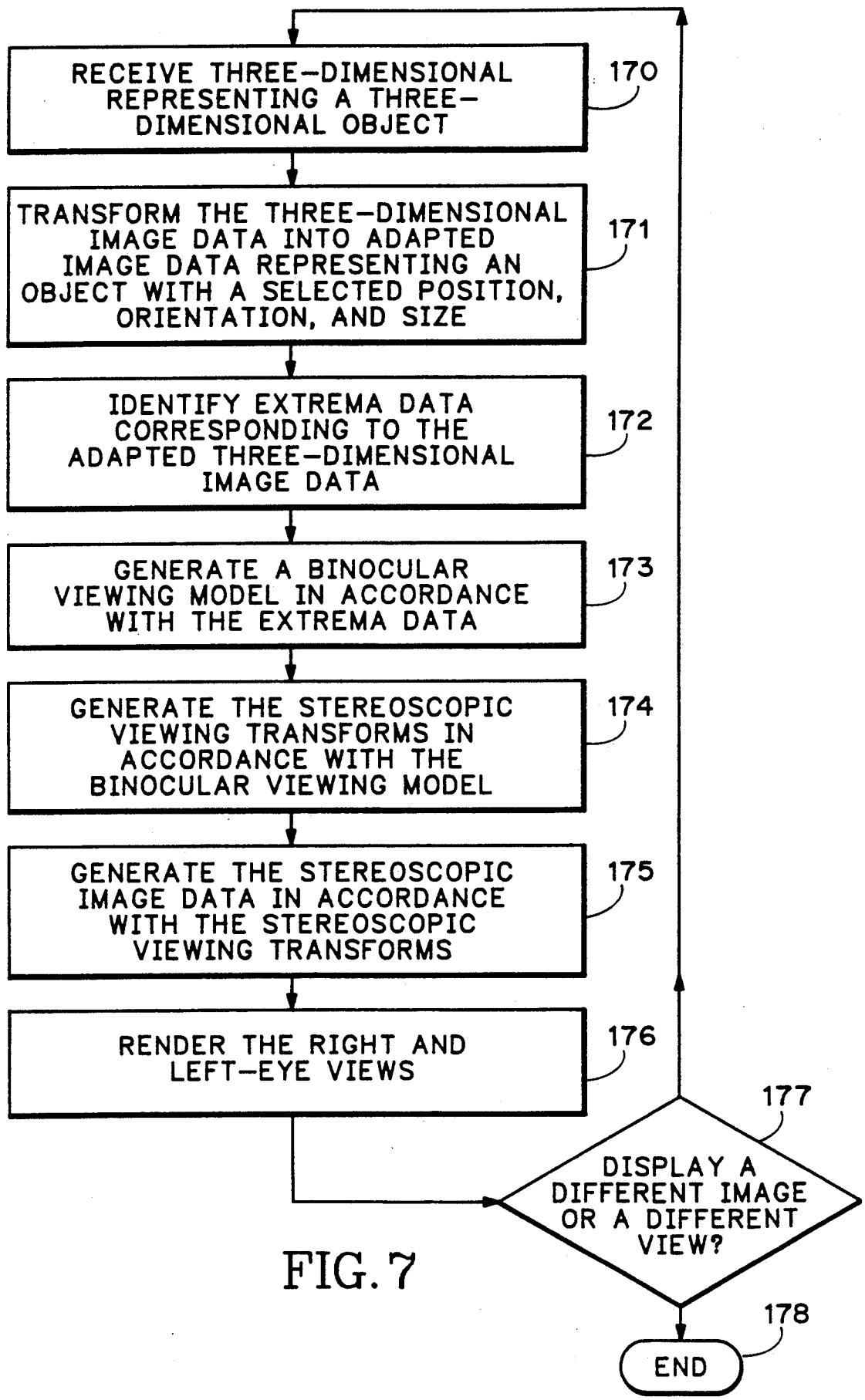
FIG. 7 is a flow diagram showing the process by which a binocular viewing model is generated in a stereoscopic graphics display system in accordance with the present invention.

FIG. 7 is a flow diagram showing the process steps by which a binocular viewing model corresponding to a selected image may be generated. It will be appreciated that these process steps can be programmed into and performed by a computer or microprocessor or, alternatively, be performed by a dedicated electronic circuit of the type shown in FIG. 4. For purposes of clarity, the flow diagram is described with reference to system controller unit 14 of FIG. 4.

Process block 120 indicates that data transform unit 18 of system controller unit 14 receives from host computer 12 three-dimensional image data representing a three-dimensional object.

Process block 171 indicates that data transform unit 18 transforms the three-dimensional image data into adapted three-dimensional image data representing the object with a selected position, orientation, and size.

Process block 172 indicates that accumulation unit 90 identifies the minimum and maximum values of the U- and W-axis coordinates (i.e., the extrema data) corresponding to the adapted three-dimensional image data.

Process block 123 indicates that viewing model generator 96 generates a binocular viewing model in accordance with the minimum and maximum values of the U- and W-axis coordinates. In the preferred embodiment, the binocular viewing model includes a zero disparity axis and a disparity angle. It will be appreciated, however, that the binocular viewing model could alternatively be defined by a pair of "centers of projection," or a focus point and an eye separation distance, or any other means of characterizing a binocular viewing model.

Process block 174 indicates that viewing transform generator 108 receives the binocular viewing model and generates in accordance with it the stereoscopic viewing transforms corresponding to the right- and left-eye views. In the preferred embodiment, the stereoscopic viewing transform provides clockwise and counter-clockwise rotations of the monocular image (represented by the adapted three-dimensional image data) about the zero disparity axis by an angle $|A'_d/2|$ Process block 175 indicates that stereoscopic image data corresponding to the right and left-eye views are generated in accordance with the stereoscopic viewing transforms.

Process block 176 indicates that the right- and left-eye views are rendered by display system 36.

Decision block 177 represents an inquiry as to whether a different image is to be displayed or a different view of the current image is to be displayed. Whenever a different image or a different view of the current image is not to be displayed, decision block 171 proceeds to a process termination block 178. Whenever a different image or a different view of a current image is to be displayed, decision block 177 returns to process block 170.

With reference to FIG. 3, border 80 of window 76 is rendered with zero disparity and, therefore, is positioned along the W-axis at a location that is coplanar with the zero disparity point or axis (i.e., in a zero disparity plane). An image component having negative disparity or parallax (i.e., appearing to be positioned in front of display screen 26) may intersect or be "clipped" by window border 80. Under such circumstances, an observer would perceive depth cue contradictions because border 80 would have zero disparity and the adjacent (i.e., intersected or clipped) image component would have a negative disparity.

To prevent depth cue contradictions under such circumstances, viewing model generator 96 establishes the zero disparity point or axis at the intersected or clipped location, thereby to form a stereoscopic image with no negative parallax. As a result, the stereoscopic image and window border 80 have the same disparity at the point of intersection (i.e., zero) and provide, therefore, no depth cue contradictions.

It will be obvious to those having skill in the art that many changes may be made to the details of the above-described preferred embodiment of the present invention without departing from the underlying principles thereof. The scope of the present invention should be determined, therefore, only by the following claims.

We claim:

1. In a stereoscopic graphics display system having a display screen upon which an image is formed in accordance with stereoscopic image data representing right- and left-eye views of an object, the right- and left-eye views differing by a binocular disparity, a method of generating the right- and left-eye views, comprising:
   identifying a region that bounds the image;
   designating within the region a zero disparity location having a zero disparity axis between the right- and left-eye views; and
   limiting the binocular disparity such that corresponding image components in the right- and left-eye views are separated on the display screen by a distance of less than a preselected maximum distance, the preselected maximum distance being selected to provide nominal fusing of the right- and left-eye views into the image.

2. The method of claim 1 in which the display screen represents a first major surface within a three-dimensional viewing volume, the method further comprising:
   representing the image by a first range of coordinate values corresponding to a depth along a first coordinate axis that intersects the first major surface and a second range of coordinate values corresponding to a width along a second coordinate axis that is transverse to the first coordinate axis and extends across the first major surface; and
   designating the zero disparity location at a position represented by coordinate values that are within the first and second ranges.

3. The method of claim 2 in which a first median value corresponds to a location substantially midway along the first range of values and in which the zero disparity location corresponds to a location identified by the first median value.

4. The method of claim 2 in which a second median value corresponds to a location substantially midway along the second range of values and in which the zero disparity location corresponds to a location identified by the second median value.

5. The method of claim 1 in which the display screen represents a first major surface within a three-dimensional viewing volume, the method further comprising:
   representing the image by a first range of coordinate values corresponding to a depth along a first coordinate axis that intersects the first major surface and a second range of coordinate values corresponding to a width along a second coordinate axis that is transverse to the first coordinate axis and extends across the first major surface;
   positioning the right- and left-eye views along respective right and left lines-of-sight having a disparity angle between them; and
   limiting the disparity angle to an amount proportional to a ratio of the width and the depth of the image.

6. The method of claim 5 in which the disparity angle is proportional to the lesser of a preselected fixed disparity angle and the preselected fixed disparity angle multiplied by the ratio of the width and the depth of the image, the preselected fixed disparity angle being selected to provide nominal fusing of the right- and left-eye vies into the image.

7. The method of claim 1 in which an image is rendered on the display screen within a display window outlined by a border with zero binocular disparity.

8. The method of claim 7 further comprising determining whether a component of the image is positioned adjacent the border of the display window and designating the component as the zero disparity location whenever the component is positioned adjacent the border of the display window.

9. The method of claim 1 in which the zero disparity location is designated to provide the image with an amount of positive disparity and an amount of negative disparity and in which the amounts of positive and negative disparity are substantially equal 10. The method of claim 9 in which the image is rendered in accordance with a perspective projection.

11. The method of claim 1 in which the image is rendered with a perspective projection and in which the zero disparity location is designated to provide a binocular disparity that is substantially independent of the perspective projection.

12. The method of claim 1 in which the stereoscopic image data correspond to three-dimensional image data representing a monocular view of the object and in which the region that bounds the image is identified with respect to the three-dimensional image data.

13. In a stereoscopic graphics display system having a display screen upon which an image is formed in accordance with stereoscopic image data representing right- and left-eye views of an object, the right- and left-eye views differing by a binocular disparity, an apparatus for generating the stereoscopic image data, comprising:
   region identification means for identifying a region that bounds the image;
   viewing model generating means for generating a binocular viewing model that establishes zero binocular disparity at a selected location within the region; and
   data generating means for generating stereoscopic image data in accordance with the binocular viewing model.

14. The apparatus of claim 13 in which the display screen represents a first major surface within a three-dimensional viewing volume, the apparatus further comprising:
   means for representing the image by a first range of coordinate values corresponding to a depth along a first coordinate axis that intersects the first major surface and a second range of coordinate values corresponding to a width along a second coordinate axis that is transverse to the first coordinate axis and extends across the first major surface; and
   means for designating the zero disparity location at a position represented by coordinate values that are within the first and second ranges.

15. The apparatus of claim 14 in the region identification means includes an extrema accumulation unit that accumulates extreme values in the first and second ranges of values.

16. The apparatus of claim 15 in which the extrema accumulation unit includes comparator means for comparing values in each of the first and second ranges with corresponding extreme values, and latch means for latching onto values in the first and second ranges whenever the values exceed the extreme values.

17. The apparatus of claim 14 in which a first median value corresponds to a location midway along the first range of values and in which the selected location corresponds to the first median value.

18. The apparatus of claim 14 in which a second median value corresponds to a location substantially midway along the second range of values and in which the selected location corresponds to the second median value.

19. The apparatus of claim 13 in which the display screen represents a first major surface within a three-dimensional viewing volume, the apparatus further comprising:
   means for representing the image by a first range of coordinate values corresponding to a depth along a first coordinate axis that intersects the first major surface and a second range of coordinate values corresponding to a width along a second coordinate axis that is transverse to the first coordinate axis and extends across the first major surface;
   means for positioning the right- and left-eye vies along respective right and left lines-of-sight having a disparity angle between them; and
   means for defining the binocular disparity as the lesser of a preselected fixed disparity angle and the preselected fixed disparity angle multiplied by the ratio of the width and the depth of the image, the preselected fixed disparity angle being selected to provide nominal fusing of the right- and left-eye views into the image.

* * * * *